(12) United States Patent
Takizawa et al.

(10) Patent No.: US 6,341,177 B1
(45) Date of Patent: Jan. 22, 2002

(54) CODE STRING EDITING APPARATUS, PICTURE CODED SIGNAL DECODING APPARATUS AND MOVING PICTURE CODED STRING DECODING APPARATUS

(75) Inventors: Masaaki Takizawa, Tokyo; Satoshi Endo, Fujisawa, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/657,005

(22) Filed: Sep. 7, 2000

Related U.S. Application Data

(63) Continuation of application No. 09/010,597, filed on Jan. 22, 1998, now Pat. No. 6,181,824.

(30) Foreign Application Priority Data

Jan. 23, 1997 (JP) .............................................. 9-010336

(51) Int. Cl.$^7$ ................................................. G06K 9/36
(52) U.S. Cl. .................................. 382/233; 375/240.25
(58) Field of Search ................................. 382/232, 233, 382/236; 348/14.14, 14.15, 385.1, 584, 588, 598; 375/240.01, 240.25; 386/109, 111

(56) References Cited

U.S. PATENT DOCUMENTS

| | | | |
|---|---|---|---|
| 4,791,489 A | 12/1988 | Polatnick .................... | 358/160 |
| 5,442,398 A | 8/1995 | Koshiro et al. ............. | 348/385 |
| 5,623,308 A | 4/1997 | Civanlar et al. ............ | 348/392 |
| 5,802,240 A | 9/1998 | Asai ............................ | 386/52 |
| 5,870,521 A | 2/1999 | Shimoda ...................... | 386/52 |
| 6,181,824 B1 * | 1/2001 | Takizawa et al. ........... | 382/233 |

FOREIGN PATENT DOCUMENTS

| | | |
|---|---|---|
| EP | 0558208 | 9/1993 |
| GB | 2016857 | 3/1979 |
| GB | 2061056 | 10/1980 |
| GB | 2240898 | 8/1991 |
| WO | 9114338 | 9/1991 |

* cited by examiner

Primary Examiner—Bhavesh Mehta
(74) Attorney, Agent, or Firm—Antonelli, Terry, Stout & Kraus, LLP

(57) ABSTRACT

A picture coded signal decoding apparatus for decoding a plurality of picture coded signals into one picture signal. The apparatus includes a code string editing unit which edits the picture coded signals to generate one picture coded signal, and a decoder which decodes the one picture coded signal to generate one picture signal. The code string editing unit generates the one picture signal representing a composite picture including pictures corresponding to said picture coded signals. Each picture coded signal includes at least one coded sub-picture representing a sub-picture having a predetermined number of scanning lines. Each coded sub-picture includes a positional code for indicating a sequential position of the sub-picture in the picture coded signal. The code string editing unit includes an extracting unit which extracts the coded sub-picture included in each picture coded signals from each the picture coded signal, a connection unit which connects the extracted coded sub-pictures in a predetermined sequence, and a numbering unit which changes the positional codes at sequential positions according to a predetermined rule.

2 Claims, 13 Drawing Sheets

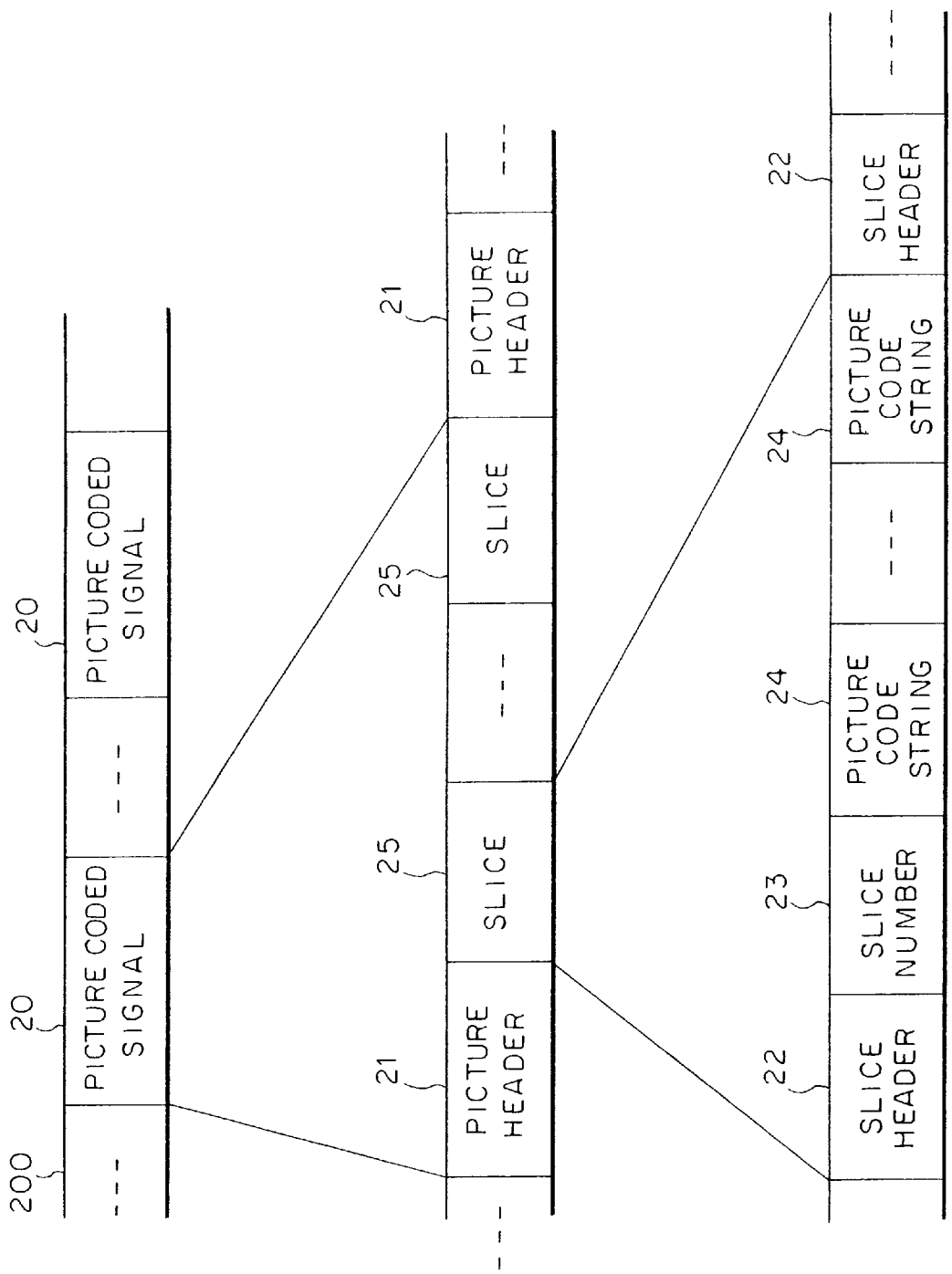

CODE STRING EDITING APPARATUS, PICTURE CODED SIGNAL DECODING APPARATUS AND MOVING PICTURE CODED STRING DECODING APPARATUS

This is a continuation of application Ser. No. 09/010,597, now U.S. Pat. No. 6,181,824 filed Jan. 22, 1998.

CROSS-REFERENCE TO RELATED APPLICATIONS

This application is related to application Ser. No. 08/782,495 filed Jan. 10, 1997 entitled "Picture Codec and Teleconference Equipment", by Y. Shibata, et al.; application Ser. No. 08/732,520, filed Oct. 15, 1996 entitled "Teleconference Terminal Equipment and Teleconference Module", by Y. Shibata, et al.; application Ser. No. 08/751,161 filed Nov. 15, 1996 entitled "Multipoint Teleconference System Employing H.221 Frames", by Y. Shibata, et al.; application Ser. No. 08/913,401 filed Jul. 15, 1992, now U.S. Pat. No. 5,365,265 entitled "Multipoint Teleconference System Employing Communication Channels Set in Ring Configuration" by Y. Shibata, et al. and application Ser. No. 08/864,187 filed May 28, 1997 entitled "TV Phone/TV Conference Terminals, Ring Type Multipoint TV Phone/TV Conference System Using the TV Phone/TV Conference Terminal, and Communication Control Method of the Conference System", by M. Takizawa, et al., the disclosures of which are incorporated herein by reference.

BACKGROUND OF THE INVENTION

The present invention relates to a code string editing apparatus, a picture coded signal decoding apparatus and a moving picture coded signal decoding apparatus. More particularly, the present invention relates to a code string editing apparatus, a picture coded signal decoding apparatus and a moving picture coded signal decoding apparatus which are suitable for decoding a plurality of picture/moving picture coded signals into a single picture/moving picture.

A conventional picture coded signal decoding apparatus 1000 will be explained below by referring to FIG. 12. This picture coded signal decoding apparatus 1000 receives four picture coded signals and decodes these signals into one picture signal.

An example of the utilization of the picture coded signal decoding apparatus 1000 will be described below. Referring to FIG. 12, four picture signals Pa, Pb, Pc and Pd are generated for pictures taken by four cameras 1a, 1b, 1cand 1drespectively. The generated four picture signals Pa, Pb, Pc and Pd are coded into picture coded signals Ca, Cb, Cc and Cd by picture coding apparatuses 2a, 2b, 2c and 2d respectively. The coded picture coded signals Ca, Cb, Cc and Cd are transferred to the picture coded signal decoding apparatus 1000 through transmission paths 3a, 3b, 3c and 3d respectively. In the picture coded signal decoding apparatus 1000, the picture coded signals Ca, Cb, Cc and Cd are decoded into a picture signal P, which is then transmitted to a monitor unit 5 through a transmission path 4 and is displayed there as a composite picture.

The operation of the conventional picture coded signal decoding apparatus 1000 will be explained next. The picture coded signal decoding apparatus 1000 is structured to include four picture decoding units 1100a, 1100b, 1100c and 1100d and one picture composing unit 1200. In the picture coded signal decoding apparatus 1000, the four picture coded signals Ca, Cb, Cc and Cd are input through the four transmission paths 3a, 3b, 3c and 3d respectively. The input picture coded signals Ca, Cb, Cc and Cd are decoded into the picture signals Pa, Pb, Pc and Pd by the picture decoding units 1100a, 1100b, 1100c and 1100d respectively. The four picture signals Pa, Pb, Pc and Pd are sent to the picture composing unit 1200 and are then composed into the one picture signal P. The composite picture signal P is sent out to the transmission path 4.

According to the conventional picture coded signal decoding apparatus described above picture decoding units corresponding to the number of picture coded signals being input are necessary. In this example illustrated in FIG. 12, four picture coded signals are applied. Thus, four picture decoding units are necessary. If more than four picture coded signals are applied then more picture decoding units are necessary. Further, for each picture decoding unit used, peripheral circuits for operating the picture decoding units are necessary. As a result, it is difficult to make a compact and economical structure for a picture coded signal decoding apparatus.

Further, in order to correspond to a change in the number of input picture coded signals, it is necessary to change the number of picture decoding units in addition to the necessary change in the structure of the picture composing unit. Accordingly, it is difficult to change the number of picture coded signals that are input.

Also, in many cases, when a picture signal is coded, the picture signal is converted into a code of a smaller capacity highly efficiently. Thus, when a picture coded signal is decoded, the capacity of the code becomes larger. Accordingly, the picture composing unit needs to process picture information of a large capacity code resulting from the decoding of a small capacity picture coded signal. Therefore, a large processing capacity is required for the picture composing unit. A large processing capacity in the picture composing unit is particularly required when a fine picture including a large quantity of information is to be processed, or when a moving picture is to be processed based on a series of pictures received continuously.

SUMMARY OF THE INVENTION

An object of the present invention to provide a picture coded signal decoding apparatus and a moving picture coded signal decoding apparatus that can be structured in one picture decoding unit.

In order to achieve the above-described object, according to a first aspect of the present invention, there is provided a picture coded signal decoding apparatus for decoding a plurality of picture coded signals into one picture signal. The picture coded signal decoding apparatus, includes a code string editing unit for editing the plurality of picture coded signals to generate one picture coded signal, and a decoding unit for decoding the generated one picture coded signal to generate one picture signal.

The code string editing unit generates one picture coded signal representing a composite picture including pictures corresponding to the plurality of picture coded signals.

According to a second aspect of the present invention, there is provided a picture coded signal decoding apparatus for decoding a plurality of picture coded signals being input into one picture signal. The picture coded signal decoding apparatus includes a picture coded signal generating unit for generating a predetermined picture coded signal, a code string editing unit for editing the plurality of picture coded signals being input and picture coded signals generated by the picture coded signal generating unit, thereby generating one picture coded signal, and a decoding unit for decoding the generated one picture coded signal, thereby generating one picture signal.

The code string editing unit generates one picture coded signal representing a composite picture including pictures corresponding to the plurality of picture coded signals being input and pictures corresponding to picture coded signals generated by the picture coded signal generating unit.

According to a third aspect of the present invention, there is provided a moving picture coded signal decoding apparatus for decoding a plurality of series of moving picture coded signals being input into one series of moving picture signals. The moving picture coded signal decoding apparatus includes a picture obtaining unit for obtaining a picture reaching within a predetermined time range, a code string editing unit for editing the plurality of series of moving picture coded signals, thereby generating one series of moving picture coded signals, and a decoding unit for decoding the generated one series of moving picture coded signals, thereby generating one series of moving picture signals.

The code string editing unit generates one series of moving picture coded signals representing composite moving picture including moving pictures corresponding to the plurality of series of moving picture coded signals.

According to a fourth aspect of the present invention, there is provided a code string editing apparatus for editing a plurality of picture coded signals being input into one picture coded signal. Each of the plurality of picture coded signals is structured to include at least one coded sub-picture for describing a sub-picture having a predetermined number of scanning lines for a picture to be described by each picture coded signal. Each one of the coded sub-pictures is structured to include a positional code for showing a sequential position in the picture coded signal.

The code string editing unit includes an extracting unit for extracting the coded sub-picture included in each of the plurality of picture coded signals from each of the plurality of picture coded signals, a connecting unit for connecting the extracted coded sub-pictures in a predetermined sequence, and a numbering unit for changing the positional codes at sequential positions according to a predetermined rule.

BRIEF DESCRIPTION OF THE DRAWINGS

The present invention will be more apparent from the following detailed description, when taken in conjunction with the accompanying drawings, in which:

FIGS. 2A–2C are explanatory diagrams for illustrating a form of the picture coded signal;

FIGS. 9A–9B are explanatory diagrams for illustrating a relationship between a range of moving pictures generated and a range of moving pictures displayed, wherein FIG. 9A illustrates a range of composed pictures as they are, and wherein FIG. 9B illustrates a range of composed moving pictures with picture elements inserted into peripheral sections;

FIGS. 10A–10B are explanatory diagrams for illustrating a relationship between a range of moving pictures generated and a range of moving pictures displayed, wherein FIG. 10A illustrates a range of composed pictures of the original pictures as they are, and wherein FIG. 10B illustrates a range of moving pictures composed after picture elements are deleted from peripheral sections of the original pictures;

FIGS. 11A–11B are explanatory diagrams for illustrating a relationship between a range of moving pictures generated and a range of moving pictures displayed for the case where a display is made by centering, wherein FIG. 11A illustrates a range of composed pictures of the original pictures as they are, and wherein FIG. 11B illustrates a range of moving pictures composed after picture elements are deleted from peripheral sections of the original pictures;

DESCRIPTION OF THE PREFERRED EMBODIMENTS

At first, a relationship between a moving picture coded signal which is a coded signal of a moving picture and a moving picture shown by a moving picture coded signal will be explained with reference to FIGS. 1A and 1B and FIGS. 2A–2C. As is well known, a picture signal shows information of each picture element on a picture by sequentially scanning (line scanning) the picture.

Figure 1A:
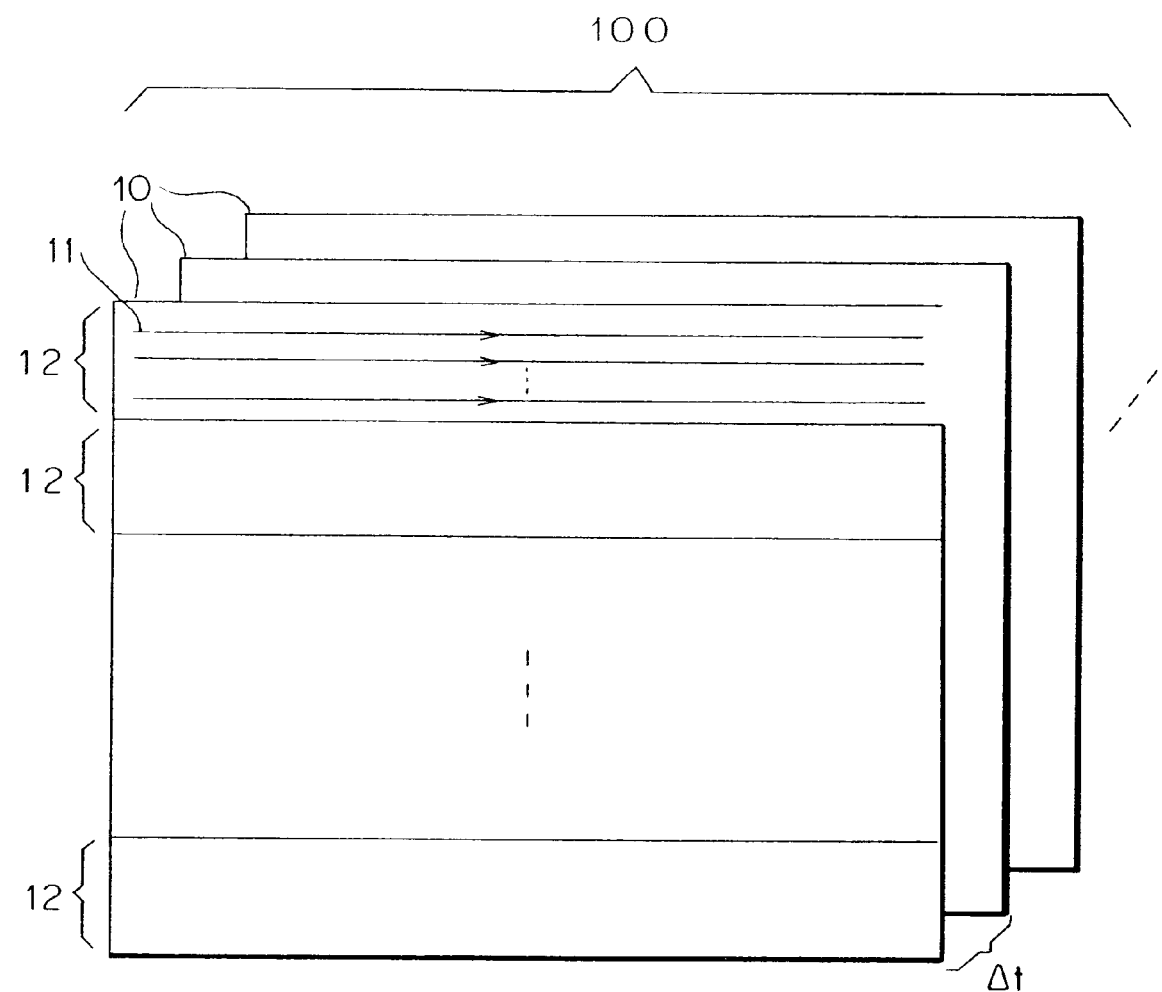
FIGS. 1A and 1B are explanatory diagrams for illustrating a picture shown by a picture coded signal.
Figure 1B:
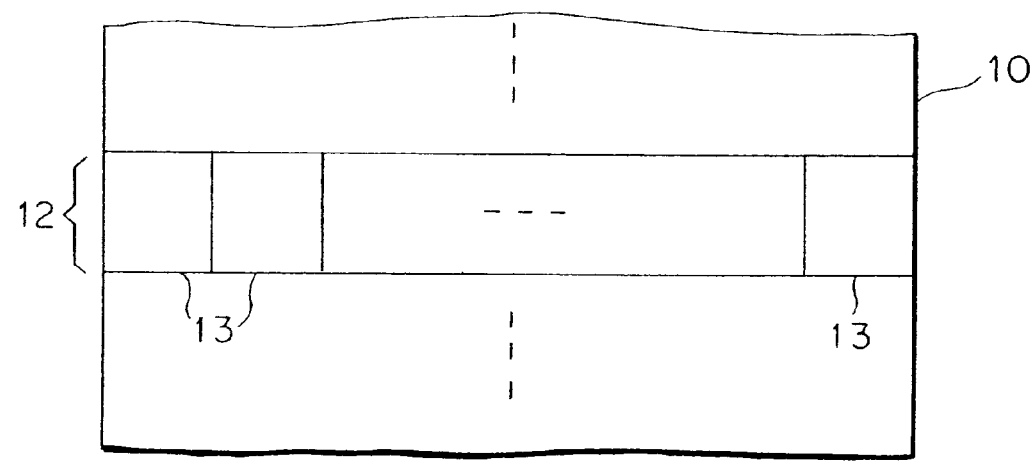

At first, a moving picture to be coded will be explained with reference to FIGS. 1A and 1B. Referring to FIG. 1A, a moving picture 100 is structured by a series of pictures 10 generated at predetermined time intervals. Each of the series of pictures 10 for structuring the moving picture 100 has at least one sub-picture 12 including a predetermined number of scanning lines. The sub-pictures 12 are disposed in parallel along a direction orthogonal with a scanning line 11. In other words, one picture 10 has either one sub-picture 12 or has a plurality of sub-pictures 12 disposed in parallel. Each sub-picture 12 has at least one picture element 13 laid along the scanning lines as shown in FIG. 1B.

A moving picture coded signal 200 for describing the moving picture 100 shown in FIG. 1A will be explained with reference to FIGS. 2A–2C. In FIG. 2A the moving picture coded signal 200 has a series of picture coded signals 20 arranged in time series. Each picture coded signal 20 corresponds to a respective picture 10 shown in FIG. 1A.

In FIG. 2B each picture coded signal 20 has a picture head 21. at its head. Further, each picture coded signal 20 has at least one coded sub-picture (hereinafter to be referred to as a slice) 25, following the picture header. Each slice 25 corresponds to a respective sub-picture 12 shown in FIG. 1A.

In FIG. 2C, each slice 25 is structured to have a slice header 22 for showing the header of the corresponding slice, a slice number 23 of the corresponding slice 25, and at least one picture code string 24 for describing the picture information. Each slice number 23 shows a sequence that the sub-picture 12 (reference FIG. 1A) corresponding to the slice 25 in which this slice number is included is disposed on the picture 10 (reference FIG. 1A). Each picture code string 24 describes the picture information of each picture element 11 (reference FIG. 1B) respectively.

Next, a first mode for carrying out the present invention will be explained with reference to FIGS. 3 and 4. The present mode of implementation is an example of a code string editing apparatus for editing four picture coded signals into one picture coded signal. The invention is not limited to an implementation where four picture coded signals are edited into one picture coded signal. The invention can operate with more than four or less than four picture coded signals.

Figure 3:
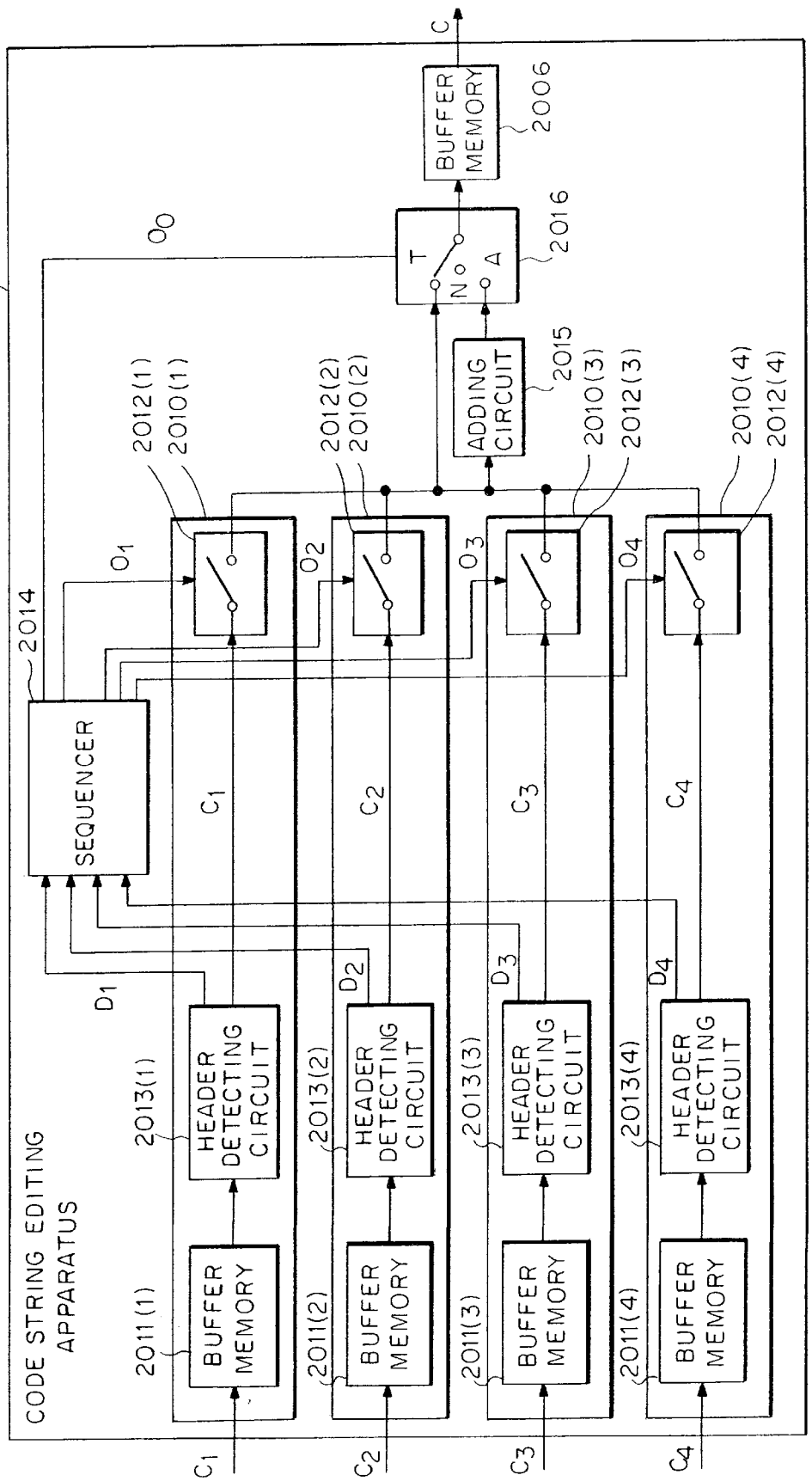
FIG. 3 is a block diagram for illustrating a configuration example of a code string editing apparatus.

In FIG. 3, a code string editing apparatus 2000 is structured to have buffer memories 2011(1) to 2011(4) for storing four picture coded signals C1, C2, C3 and C4 respectively being input, header detecting circuits 2013(1) to 2013(4) for detecting picture headers and slice headers, switches 2012(1) to 2012(4) for selecting buffer memories for reading out picture coded signals, an adding circuit 2015 for adding a predetermined number to a slice number, a switch 2016 for replacing or deleting a slice number, a sequencer 2014 for controlling the switches 2012(1) to 2012(4) and 2016, and a buffer memory 2006 for smoothing the output of an edited picture coded signal. The respective buffer memories 2011(i) (in this case, i represents each of 1, 2, 3 and 4), the respective header detecting circuits 2013(i) and the respective switches 2012(i) are formed as four respective series of input sections 2010(i).

The buffer memories 2011(1) to 2011(4) are for absorbing a time difference between a timing when the picture coded signals C1, C2, C3 and C4 are input and a timing when the picture coded signals C1, C2, C3 and C4 are read out. Each header detecting circuit 2013(i) reads out a picture coded signal Ci from the buffer memory 2011(i) of the corresponding series when the switch 2012(i) of the corresponding series is in the closed state, and sends this signal to the switch 2012 (i) and, at the same time, detects the picture header and the slice header included in this picture coded signal Ci and sends a detection signal Di to the sequencer 2014 after the detection. Each switch 2012(i) selectively achieves the closed state and the open state according to an instruction $O_i$ given from the sequencer 2014.

The adding circuit 2015 stores in advance a numerical value to be added, and replaces a slice number included in the picture coded signal with a slice number which is the former slice number added with the numerical value. The adding circuit 2015 can be structured by, for example, the following members not shown such as a memory in which the numerical value to be added is stored in advance, a slice number detecting section for detecting a code string for showing a slice number from the picture coded signal, a slice number reading section for reading the slice number shown by the detected code string, an adder for adding the numerical value stored in the memory to the read slice number, a code string generating section for generating a code string for showing the added slice number, and an editing section for replacing the code string showing the slice number included in the picture coded signal with the generated code string.

In order to provide the memory with a numerical value to be added in advance, the numerical value may be fixedly stored in the memory in advance, or the memory may be structured so as to be rewritable and an input section for inputting a numerical value to the memory is provided so that a numerical value to be added is given according to the number of slices included in the picture coded signal.

The switch 2016 can selectively achieve the following three states: a through-state T in which a direct contact is possible from the switches 2012(1) to 2012(4), an add state A in which a direct connection is made to the adding circuit 2015 and a delete state N in which the input side is set to the open state. Any one of these three states is selected based on an instruction $O_0$ from the sequencer 2014.

The sequencer 2014 is given in advance a sequence processing procedure, and carries out a sequential control of the switches 2012(1) to 2012(4) and the switch 2016 by proceeding with the sequence based on a detection signal which indicates that the picture header has been detected and a detection signal which indicates that the slice header has been detected. The detection signals are received from each header detecting circuit 2013 respectively. Details of the sequence processing will be explained later.

The outline of the operation of the code string editing apparatus 2000 will be explained next. When the four picture coded signals C1, C2, C3 and C4 are input, they are stored in the buffer memories 2011(1) to 2011(4) respectively. When the sequencer 2014 has sent an instruction $O_i$, to one of the switches 2012(i') to set it to the closed state, a picture coded signal Ci' is read out from a buffer memory 2011(i') which belongs to an input section 2010(i') of the same series as that of the switch 2012(i'), and the read-out picture coded signal Ci' is sent to 2013 (i') and is also sent to the adding circuit 2015 and the switch 2016 through a header detecting circuit 2013(i').

In the adding circuit 2015, the slice number of the picture coded signal Ci' included therein is replaced by the slice number which is added by a predetermined number. Based on the instruction $O_0$ of the sequencer 2014, the switch 2016 selects any one of the picture coded signal added with the slice number by the adding circuit 2015 and the picture coded signal sent directly without passing through the adding circuit 2015, and further, if indicated by the instruction $O_0$, deletes the slice number from the selected picture coded signal. The switch 2016 then sends the selected picture coded signal or the picture coded signal of which slice number has been deleted to the buffer memory 2006. The picture coded signal sent to the buffer memory 2006 has its time axis smoothed and is output as one picture coded signal C.

On the other hand, the header detecting circuit 2013(i') detects a slice header from the picture coded signal Ci', and sends a detection signal Di' to the sequencer after having detected the slice header from the picture coded signal Ci'. When the detection signal Di' has been sent to the sequencer 2014, the sequencer 2014 sends an instruction to the switch 2012(i') to set this switch to the closed state, and further sends an instruction to the next switch 2012(i") in a predetermined sequence to set this switch to the closed state. Thereafter, the picture coded signals C1, C2, C3 and C4 are read out for each slice in the same manner. By reading the picture coded signals from each slice for one picture component, the picture coded signals C1, C2, C3 and C4 can be edited into one picture coded signal. Further, by repeating the above-described operation, a moving picture coded signal to which the picture coded signals C1, C2, C3 and C4 are applied sequentially can be edited into one moving picture coded signal.

Next, description will be made of the operation of the code string editing apparatus 2000 in the case where picture coded signals C1, C2, C3 and C4 for showing four pictures (1) to (4) each having a predetermined number of sub-pictures, for example, fifteen (15), with reference to FIG. 4. In this case, if the number of sub-pictures is not given in advance, it is possible to decide whether the picture coded signals of the picture have been read out or not by detecting the picture header, as described above.

Figure 4:
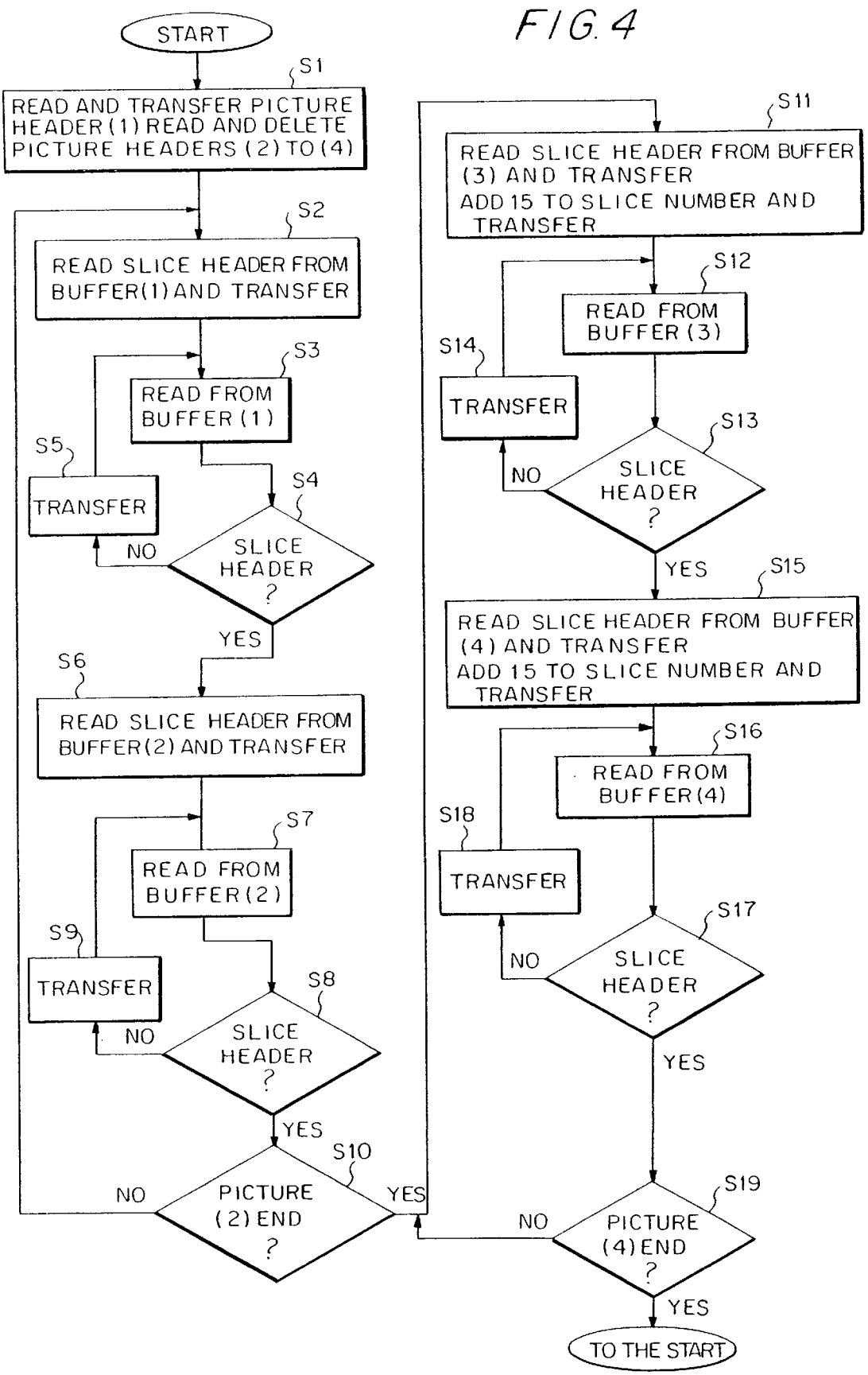
FIG. 4 is a flow chart for illustrating an operation of the code string editing apparatus.

Referring to FIG. 4, at first, a picture header is read out from each of the respective buffer memories 2011(1) to 2011(4) (step S1). In other words, the picture coded signal C1 is read out from the buffer memory 2011(1) and the picture header is detected. Then, the detected picture header is transferred to the buffer memory 2006. Then, the picture coded signals C2, C3 and C4 are read out from the buffer memories 2011(2) to 2011(3), the picture headers are read out, and these picture headers are deleted directly without being transferred.

The reading of the picture coded signal C1 from the buffer memory 2011(1) is started (step S2). In this case,. the picture coded signal is transferred to the buffer memory 2006 in the state of including the slice header. Then, the reading from the buffer memory 2011(1) is continued further (step S3). In this case, it is decided whether the slice header is detected from the read-out picture coded signal or not (step S4). When the slice header is not detected, the read-out picture coded signal is transferred to the buffer memory 2006 (step S5). If the slice header has been detected, the reading from the buffer memory 2011(1) is stopped. The picture coded signal for one slice is read out from the buffer memory 2011(1) in the manner as described at the steps S3 to S5.

Next, the reading of the coded picture signal C2 from the buffer memory 2011(2) is started (step S6). In this case, the picture coded signal is transferred to the buffer memory 2006 in the state of including the slice header, in the same manner as described at the step S2. At steps S6 to S9, the picture coded signal for one slice is read out from the buffer memory 2011(2) in the same manner as described at the steps S3 to S5.

When it has been decided that the slice header was detected, a decision is made as to whether the reading of the picture (2) has been finished or not (step S10). This decision can be done by deciding whether the reading of slices from the buffer memory 2011(2) has been carried out fifteen (15) times or not. In this case, if the number of sub-pictures has not been given in advance, it is possible to decide whether the reading of the picture coded signal C2 of the picture (2) has been finished or not by detecting the picture header in the manner as described above. If the reading of the picture (2) has not been finished as a result of the decision at the step S10, the process goes back to the reading of the buffer memory 2011(1). In the manner as described above, it is possible to read out the picture coded signals one slice by one slice alternately from the buffer memories 2011(3) and 2011(4).

In the manner as described above, it is possible to transfer to the buffer memory 2006 a picture coded signal showing a picture having a picture shown by the picture coded signal C2 read out from the buffer memory 2011(2) disposed at a right-hand side position of a picture shown by the picture coded signal C1 read out from the buffer memory 2011 (1). At the step S10, when the reading of the picture (2) has been finished, the reading from the buffer memory 2011(3) is started.

At steps S11 to S19, the picture coded signals are read out by each one slice alternately from the buffer memories 2011(3) and 2011(4) in the same manner as described at the steps S2 to S10. However, the process at the steps S11 to S19 is different from that at the preceding steps in that the slice number is transferred in the state that the slice number included in each slice is replaced by the slice number to which the number 15 which is the number of sub-pictures included in the picture is added. With this arrangement, it is possible to make the coded picture signals read out from the buffer memories 2011(3) and 2011(4) correspond to a lower-side position of the picture of the picture coded signal read out from the buffer memory 2006. In this case, if the number of sub-pictures to be added is not given in advance, the number of reading slices until the picture head has been detected is counted and this number can be used as the number of the sub-pictures.

In the manner as described above, it is possible to generate a picture coded signal for showing one picture which includes four pictures shown by the four picture coded signals C1, C2, C3 and C4 stored in the buffer memories 2011 (1) to 2011 (4). Further, by repeating the above process, it is possible to generate a moving picture coded signal for showing one moving picture including four moving pictures shown by four moving picture coded signals.

In the above explanation, description has been made of the case where, when four picture coded signals/moving picture coded signals are input, these signals are edited into a picture coded signal/moving picture coded signal for showing one picture/moving picture having pictures/moving pictures of the input signals respectively disposed in vertical and lateral rows in which each row has two pictures. However, the picture arrangement is not limited to the above. For example, when two or more picture coded signals/moving picture coded signals are input, these signals may be edited into a picture coded signal/moving picture coded signal for showing a picture/moving picture having pictures/moving pictures respectively shown by the given signals laid out in one vertical or lateral string. Further, the number of pictures/moving pictures being input is not limited to 4 but may also be other numbers such as 2, 6, 9, 12, for example.

A second mode for carrying out the present invention will be explained with reference to FIG. 5. A code string editing apparatus in the present mode of implementation is structured by using an operating unit to be operated by referring to a program for describing a processing procedure. The function of the code string editing apparatus which implements a second mode is similar to that of the code string editing apparatus in the above-described first mode of implementation.

Figure 5:
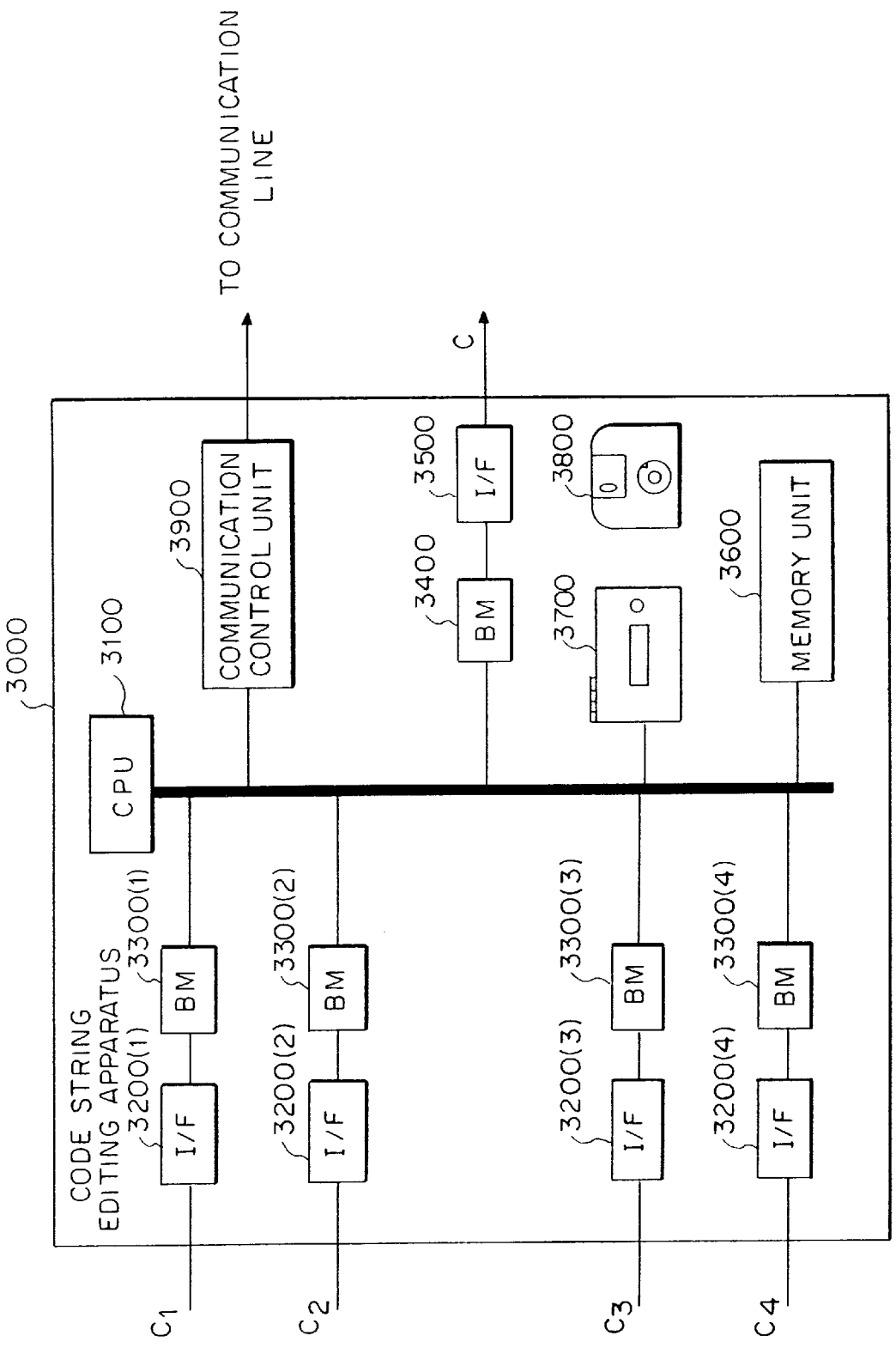
FIG. 5 is a block diagram for illustrating another configuration example of a code string editing apparatus.

In FIG. 5, a code string editing apparatus 3000 is structured to have a memory unit 3600 for storing a code string editing program describing a code editing processing procedure, a central processing unit (CPU) 3100 for executing the processing, interfaces 3200(1) to 3200(4) and 3500 for carrying out an input and output to and from the outside, buffer memories 3300(1) to 3300(4) for storing picture coded signals to be given through the interfaces 3200 (1) to 3200 (4) respectively, and a buffer memory 3400 for storing a picture coded signal generated as a result of the processing. The CPU 3100 has a processor, a main storage unit and an interface, not shown respectively. The CPU 3100 stores a program obtained from the memory unit 3600 in the main memory unit, and executes a processing according to a procedure described by this program.

A code string editing program for editing a picture coded signal is stored in the memory unit 3600. In the code string editing program, a processing procedure to be executed according to the above-described flowchart illustrated in FIG. 4 in the first mode of implementation is described. The code string editing program is supplied by being stored in a memory medium 3800, for example. The code string editing program is read out by a memory medium reading unit 3700 and is then stored in the memory unit 3600. The code string editing program stored in the memory unit 3600 is obtained by the CPU 3100 at the time of execution, so that the CPU 3100 executes the processing according to the procedure described in the program. Thus, the processing for editing the code string is achieved. As the memory medium 3800, a portable type memory medium can be used, for example. More specifically, a magnetic recording medium, an optical recording medium, a semiconductor memory, etc. can be pointed out, for example.

A program may also be obtained by a communication control unit 3900 through a communication line. For example, it is possible to obtain a program stored in information equipment connected by the communication line. Further, it is also possible to obtain a program stored in a server on a network by obtaining a connection to the server.

In FIG. 5, four input picture coded signals C1, C2, C3 and C4 are stored in the buffer memories 3300(1) to 3300(4) through the interfaces 3200(1) to 3200(4) respectively. The CPU 3100 sequentially reads out the picture coded signals C1, C2, C3 and C4 stored respectively in the buffer memories 3300(1) to 3300(4), edits picture headers, slice headers and slice numbers included in these picture coded signals and stores them in the buffer memory, based on the code string editing program stored in the memory unit 3600.

Thus, at first, the picture headers are read out from the buffer memories (1) to (4) respectively, and only the picture header read out from the buffer memory (1) is transferred to the buffer memory 3400 and all other picture headers are deleted. Next, the picture coded signals C1 and C2 are read out slice by slice alternately from the buffer memories 3300(1) and 3300(2), and these are transferred to the buffer memory 3400 by keeping the slice numbers. Then, the picture coded signals C1 and C2 are read out by one slice by one slice alternately from the buffer memories 3300(3) and 3300(4), and these are transferred to the buffer memory 3400 by adding the number of sub-pictures (for example, 15) included in the picture to the slice number. The editing procedures are similar to those of the first mode of implementation described above, so that their detailed description will be omitted.

In the above explanation, description has been made of the case where, when four picture coded signals/moving picture coded signals are given, these signals are edited into a picture coded signal/moving picture coded signal for showing one picture/moving picture having pictures/moving pictures of the given signals respectively disposed in vertical and lateral rows in which each row has two pictures. However, the picture arrangement is not limited to the above. The number of these given picture coded signals/ moving picture coded signals and the disposition of the generated pictures/moving pictures shown by the picture coded signals/moving picture coded signals are not limited to the above, as is the case with the above-described first mode of implementation.

According to the present mode of implementation, it is possible to correspond to changes in the number of given pictures/moving pictures by changing only the parameters within the code string editing program and the allocation of the buffer memory area, without changing the hardware structure of the units.

Next, a third mode for carrying out the present invention will be explained with reference to FIG. 6. The third mode of implementation is an example of a picture coded signal decoding apparatus for decoding four picture coded signals into one picture.

Figure 6:
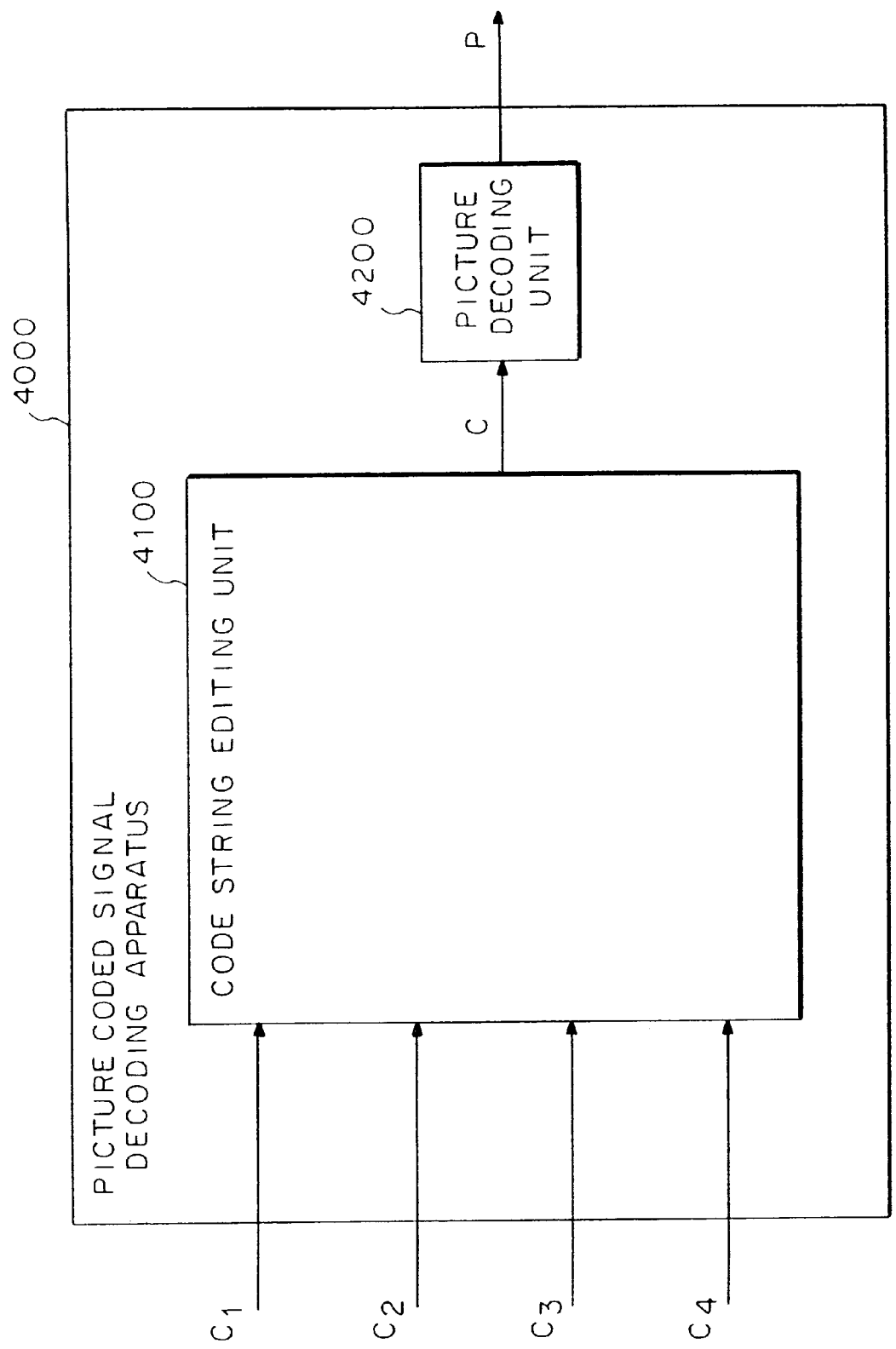
FIG. 6 is a block diagram for illustrating a structure of a picture coded signal decoding apparatus.

In FIG. 6, a picture coded signal decoding apparatus 4000 of the third mode of implementation is structured to have a code string editing unit 4100 for editing four picture coded signals into one picture coded signal and one picture decoding unit 4200 for generating a picture signal by decoding picture coded signals. The code string editing unit 4100 can be structured to have a similar structure to that of the code string editing apparatus 2000 in the first mode of implementation or the code string editing apparatus 3000 in the second mode of implementation. Accordingly, detailed explanation of this apparatus will be omitted.

The picture decoding unit 4200 is for generating a picture signal by decoding input picture coded signals according to code rules for picture coded signals. For example, the picture decoding unit 4200 can be structured by using a decoder structured as an exclusive hardware built in advance with procedures for decoding a picture coded signal into a picture signal. For example, an integrated circuit or a substrate built in with a function for decoding a picture coded signal is commercially available. The structure and process contents of such a decoder are well known, and therefore, their detailed explanation will be omitted. The function of the picture decoding unit may also be realized by a general operating unit which operates according to a program describing the procedure for decoding a picture coded signal into a picture signal.

According to the third mode of implementation, the picture coded signal decoding apparatus can be structured by one picture decoding unit so that the picture coded signal decoding apparatus can be provided in a compact and economical form. Further, it is possible to cope with changes in the number of given pictures by using the code string editing apparatus 3000 of the second mode of implementation as the code string editing unit 4100, without changing the hardware structure.

Next, a fourth mode for carrying out the present invention will be explained with reference to FIGS. 7 and 8. The fourth mode of implementation is an example of a moving picture coded signal decoding apparatus for decoding a plurality of moving picture coded signals being input into one moving picture signal. The moving picture coded signal decoding apparatus of the further mode of implementation can be structured by using the moving picture coded signal decoding apparatus according to the third mode of implementation. An outline of operation is that moving picture coded signals for sequentially showing pictures respectively input to the moving picture coded signal decoding apparatus, and a decoding including a composition for sequentially composing pictures is executed to the picture coded signals included in these moving picture coded signals so that the signals are decoded into one moving picture signal.

Figure 7:
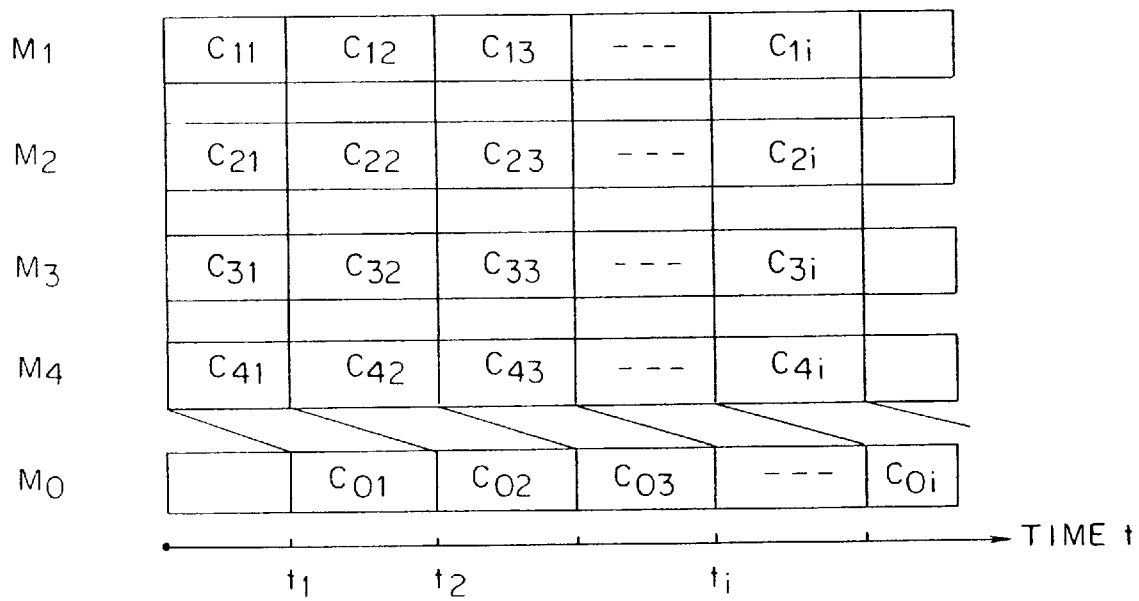
FIG. 7 is a timing chart for illustrating a timing when a picture coded signal included in a moving picture coded signal reaches when frames are in synchronism with each other.

As shown in FIG. 7, when picture coded signals $C_{ij}$, $C_{2j}$, $C_{3j}$ and $C_{4j}$ included in moving picture coded signals M1, M2, M3 and M4 respectively are input in synchronism with each other, it is possible to sequentially carry out the above-described operation at times $t_j$ when the picture coded signals $C_{ij}$, $C_{2j}$, $C_{3j}$ and $C_{4j}$ are input, transmit generated coded pictures $C_{0j}$ and decode them into a moving signal MO. However, in many applications, pictures are not always input in synchronization between the series. Therefore, the moving picture coded signal decoding apparatus of the fourth mode of implementation is structured to be able to be applied to the case where the frame speed of moving pictures is independent or the case where the frame speed changes independently.

Figure 8:
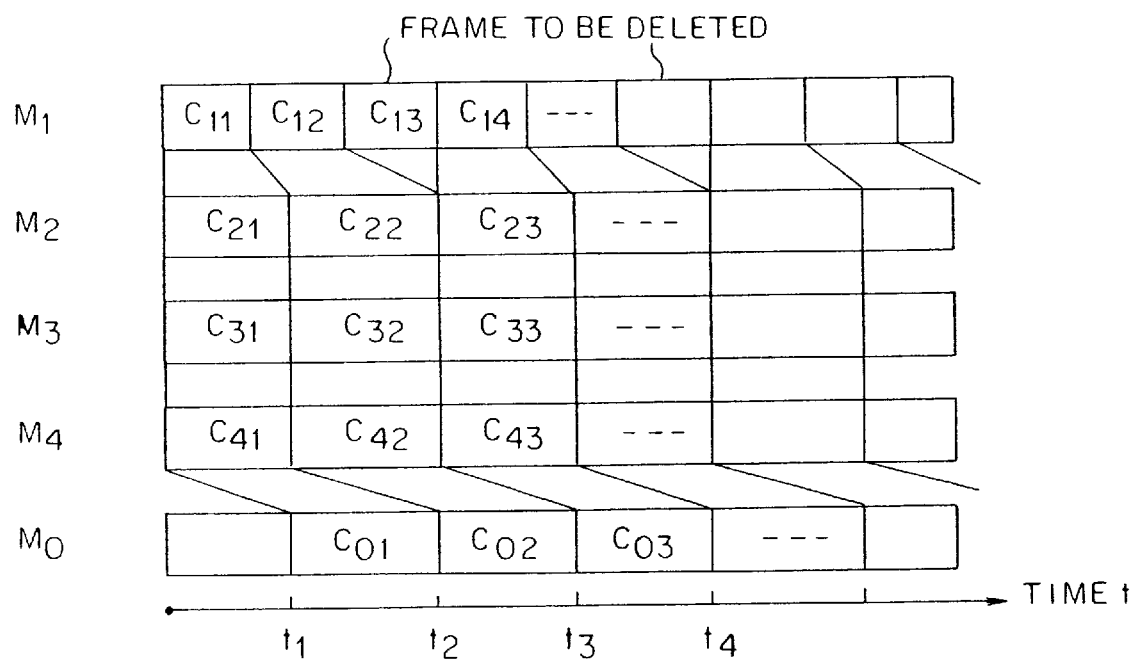
FIG. 8 is a timing chart for illustrating a timing when a picture coded signal included in a moving picture coded signal reaches when there is a frame which is not in synchronism with other frames.

With reference to FIG. 8, description will be made of the case where the number of the picture coded signals $C_{1j}$ included in the moving picture coded signal M1 is larger than the number of the picture coded signals $C_{2j}$, to $C_{4j}$ included in other moving picture coded signals M2 to M4. Referring to FIG. 8, in the picture coded signals $C_{1j}$ included in the moving picture coded signal M1, $C_{13}$ reaches earlier than the picture coded signals $C_{23}$ to $C_{43}$ included in other moving picture coded signals M2 to M4. Then, the picture coded signal $C_{14}$ which is the next frame of the moving picture coded signal M1 reaches together with the picture coded signals $C_{23}$ to $C_{43}$ included in other moving picture coded signals M2 to M4. According to the moving picture coded signal decoding apparatus of the fourth mode of implementation, a frame which reaches as a single, that is, the picture coded signal $C_{13}$ is deleted, and the frames that reach at the time t2, that is, the picture coded signals $C_{14}$ and $C_{23}$ to $C_{43}$ are decoded. By dropping the frame of the moving picture having such a fast frame speed, it becomes always possible to generate a moving picture signal for sequentially displaying pictures having four moving pictures composed with decoded moving picture signals.

Further, when the frame speed of a plurality of moving pictures is fast, it is possible to drop frames based on the timing of the reaching of a picture coded signal for the moving picture coded signal of which frame speed is the lowest.

Although description has been made of the case where the input number of moving picture coded signals is four in the above explanation, the number is not limited to four as is the case with the above-described first to third modes of implementation.

As a more detailed application example of the picture signal decoding apparatus of the fourth mode of implementation, this can be applied to the moving picture coded signal as standardized in MPEG-2 (Moving Picture Experts Group-2). More specifically, for example, when four picture coded signals for showing four low-resolution screens respectively are input according to the MPEG-2 standard, these signals can be composed into a composite picture signal for showing one medium-resolution screen determined by the MPEG-2. In this case, a picture of low resolution is structured to have 15 sub-pictures each including 16 scanning lines vertically and 176 pixels laterally, so that there are 240 scanning lines vertically and 176 pixels laterally in total as the picture. A picture of medium resolution have 480 scanning lines vertically and 704 pixels laterally.

Further, at the time of generating a moving picture signal, picture elements artificially generated can be inserted into the peripheral section of each picture structuring a moving picture. In other words, by providing a picture element generating unit for generating the picture elements to be inserted, the picture generated by this is given to the code string editing apparatus, so that the picture elements can be inserted into the moving picture to be generated.

Figure 9A:
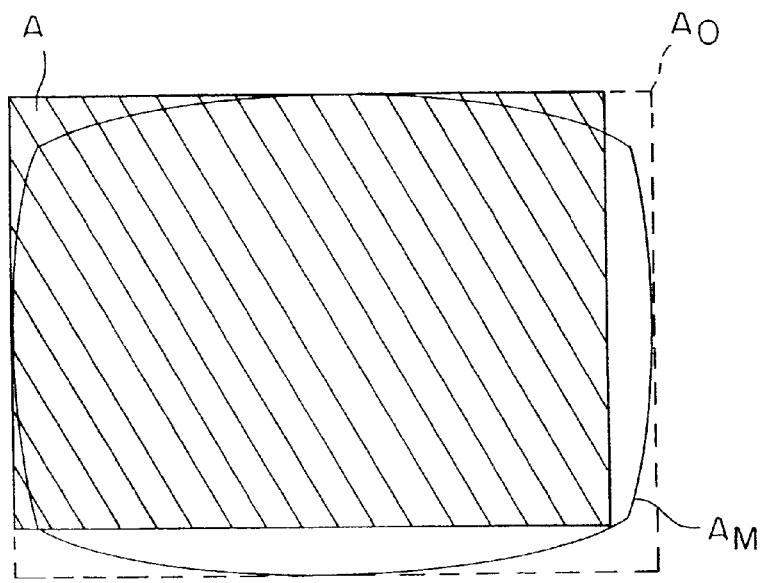

In general, a monitoring unit such as a CRT to be used for displaying a moving picture has, in many cases, a bent border for the range where a display is actually made. To be more specific, as shown in FIG. 9A, for a range of $A_0$ in which a moving picture is to be accepted by a monitoring unit, in practice, a moving picture is displayed in only a range $A_M$ by being limited by a mask or the like, so that a part of the screen is dropped. In this case, when a range A for a generated moving picture is smaller than the range $A_0$, it becomes possible to disperse the dropped portion to the peripheral section of the screen by inserting picture elements into the starting point side of the scanning line of the monitoring unit.

Figure 9B:
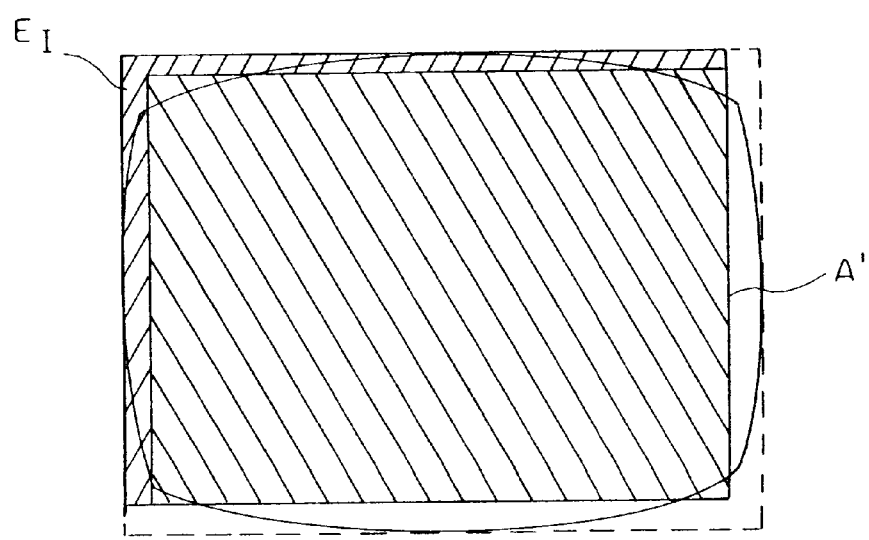

In other words, as shown in FIG. 9B, by inserting the picture elements into the section of $E_1$ and this section is given. as a range A' in the monitor, the dropped section of the range A for the generated moving picture can be dispersed to the four corners of the screen, and this section can be made smaller.

Figure 10A:
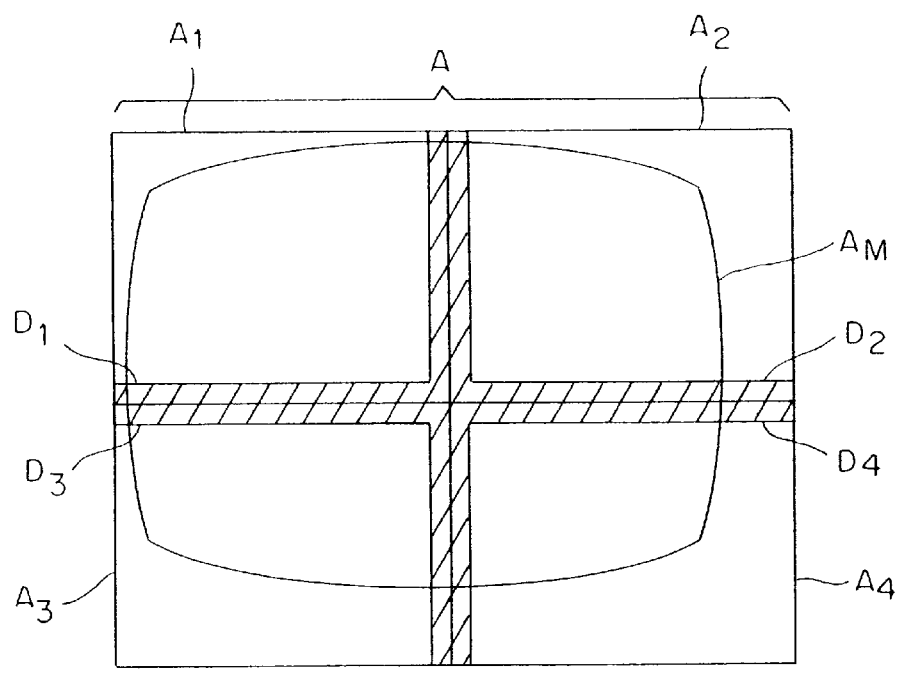
Figure 10B:
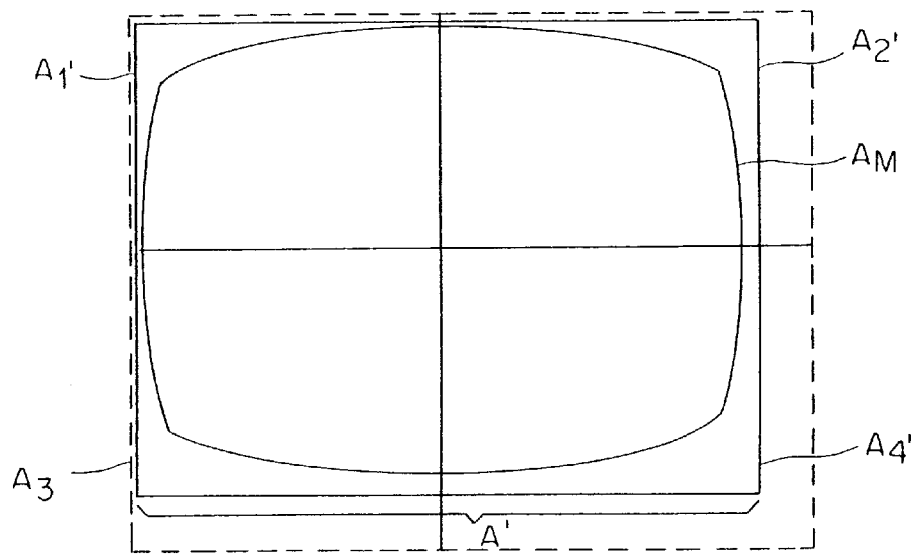

Further, at the time of generating a composite moving picture signal, the composite moving picture can be generated in the state that the picture code string corresponding to the picture elements at a predetermined section of the periphery of each given moving picture is deleted. For example, as shown in FIG. 10A, a moving picture having four moving pictures composed, each having a range of $A_1$, $A_2$, $A_3$ and $A_4$ respectively, becomes a range A. Thus, this range A exceeds an actual display range AM of the monitoring unit. In such a case, the picture coded strings corresponding to the picture elements at sections of ranges $D_1$, $D_2$, $D_3$ and $D_4$ in the ranges $A_1$, $A_2$, $A_3$ and $A_4$ of the moving pictures are deleted, and these pictures are composed to be located within ranges of $A_1$, $A_2$, $A_3$, and $A_4$, as shown in FIG. 10B. In this way, those dropped sections which can not be displayed-can be inserted into the peripheral sections of the ranges $A_1$, $A_2$, $A_3$ and $A_4$ of the pictures.

Figure 11A:
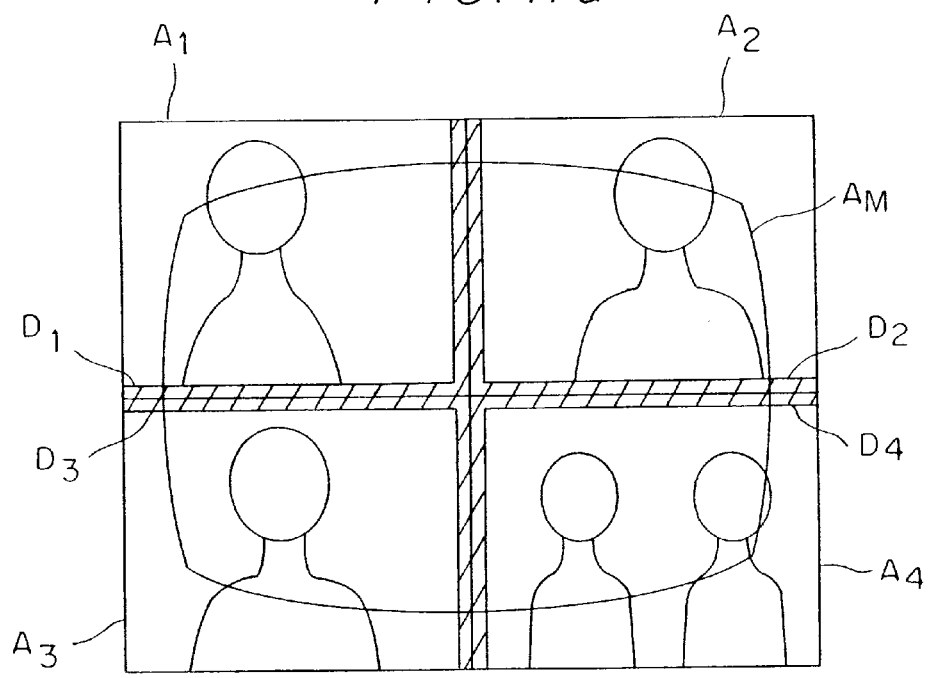
Figure 11B:
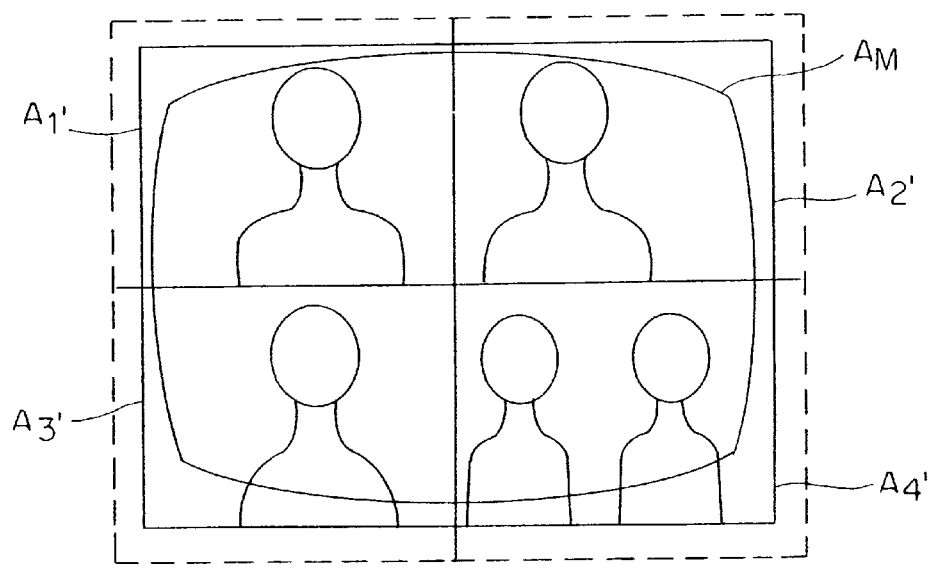
Figure 12:
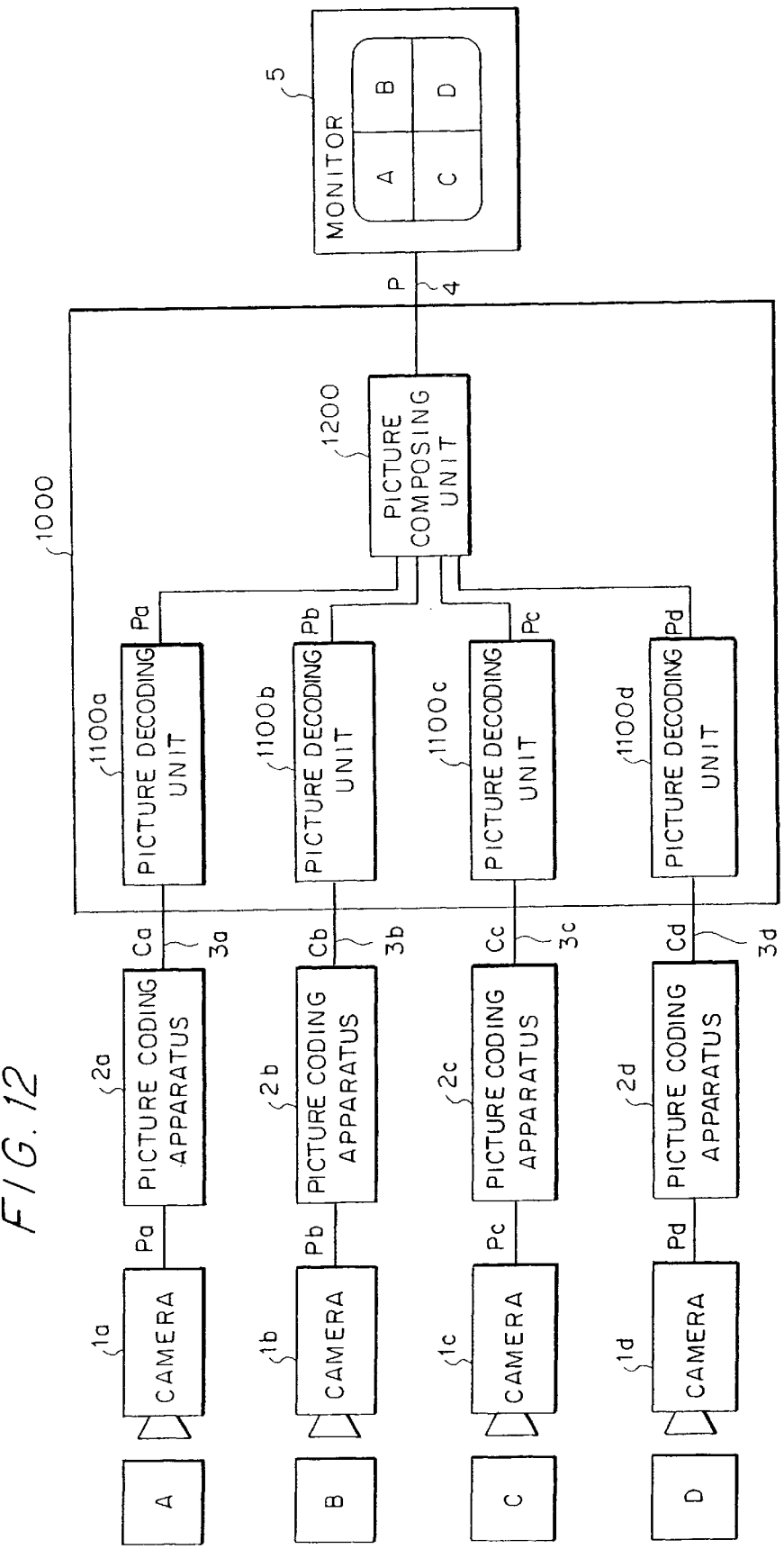
FIG. 12 is a block diagram for illustrating a structure of a prior-art picture code signal decoding apparatus.

This is also effective in the case of displaying a composite picture by matching the center of the range $A_M$ actually displayed to the center of the range A of the composed moving picture. In other words, by making a display in the manner as shown in FIG. 11B, dropped sections which are not displayed can be dispersed to the peripheral sections of the areas $A_1$, $A_2$, $A_3$ and $A_4$ of the moving pictures to be composed. As described above, when important information is displayed at the center of the pictures to be composed, an insertion or a deletion of picture elements to match the picture display range enables to avoid a loss of the information.

Figure 14:
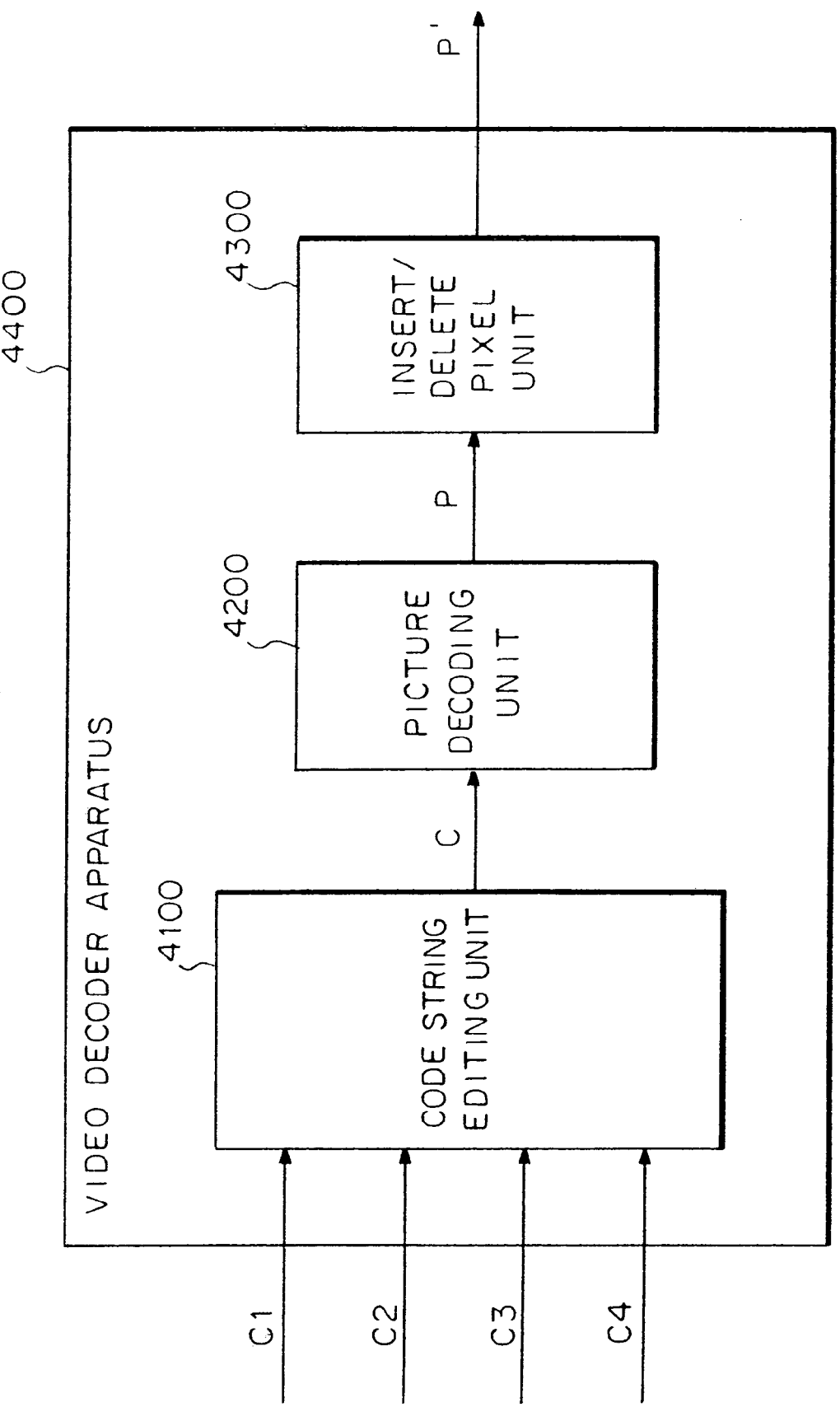
FIG. 14 is a block diagram for illustrating a structure of a video decoder apparatus having an insert/delete pixel unit.

FIG. 14 illustrates a video decoder apparatus 4400 which operates in the same manner and includes elements similar to the picture coded signal decoding apparatus 4000 illustrated in FIG. 6. The video decoder apparatus 4400 includes a code string editing unit 4100 which receives as inputs the four picture coded signals C1, C2, C3 and C4 which are processed so as form one picture coded signal C, a picture decoding unit 4200 which generates a picture signal P by decoding the one picture coded signal provided by the code string editing unit 4100 and an insert/delete pixel unit 4300 which generates a corrected picture signal P' by inserting or deleting pixels with respect to the picture signal P provided by the picture decoding unit 4200 as described above information exists when important.

Figure 13:
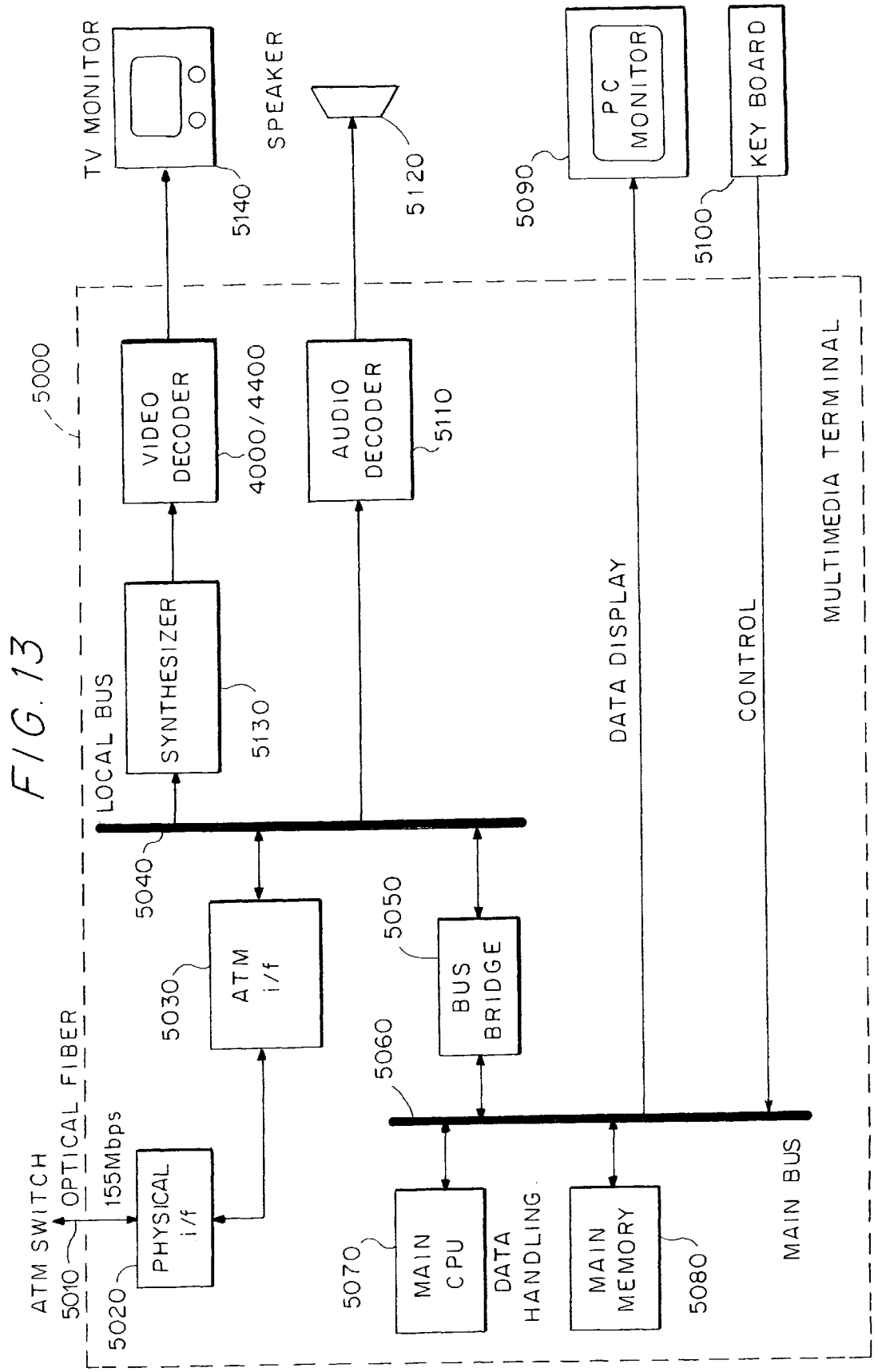
FIG. 13 is block diagram for illustrating a configuration of a multimedia terminal to which the present invention is applied.

The video decoder apparatus illustrated in FIG. 14 or the picture coded signal decoding apparatus 4000 illustrated in FIG. 6 can be included in a multimedia terminal 5000 such as that illustrated in FIG. 13. The multimedia terminal 5000 is constructed so as to handle various media including data and video which may be supplied from an ATM switch (not shown) through an optical fiber 5010. Data from the optical fiber 5010 are supplied to a physical interface 5020 which provides the physical connection to the optical fiber 5010 and converts optical signals on the optical fiber 5010 to an electrical signal. The physical interface 5020 supplies the electrical signal to the ATM interface 5030 which provides the electrical signal to the local bus 5040 provided in the multimedia terminal 5000.

The local bus 5040 is connected to a bus bridge 5050 which provides a bridge for the transfer of electrical signals between the main bus 5060 and the local bus 5040. The main bus has connected thereto the main CPU 5070 and the main memory 5080. The main CPU 5070 controls operation of the multimedia terminal 5000 and performs data handling operations. The main memory 5080 has stored therein the program executed by the main CPU 5070 to control operation of the multimedia terminal 5000 and to perform data handling operations. The main CPU 5070 controls operation of the PC monitor 5090 and the keyboard 5100 via the main bus 5060. The PC monitor 5090 allows for display of data processed by the main CPU 5070 and the keyboard 5100 allows for input of commands and instructions by the operator to the main CPU 5070 via the main bus 5060.

The local bus 5040 is also connected to an audio decoder 5110 which decodes audio data provided on the local bus 5040 and outputs an audio signal representative of the audio data to a speaker 5120. The audio decoder can be of the MPEG type so as to handle data conforming to the MPEG standard.

Further connected to the local bus 5040 is a synthesizer 5130 which synthesizes video data provided on the local bus 5040 and supplies such synthesized video data to a video decoder which may be constructed in the form of either the picture coded signal decoding apparatus 4000 illustrated in FIG. 6 or the video decoder apparatus 4400 illustrated in FIG. 14. The video decoder 4000/4400 can be of the MPEG-2 type so as to handle data conforming to the MPEG-2 standard. Data decoded by the video decoder 4000/4400 are supplied to a TV monitor 5140.

By use of the above-described multimedia terminal 5000 illustrated in FIG. 13, an operator is able to view an image made up of multiple pictures wherein the image is generated by a picture coded decoding apparatus and a moving picture coded signal decoding apparatus that is constructed in one picture decoding unit.

As explained above, according to the present invention, it becomes possible to reduce the number of picture decoders to one for achieving a picture coded signal decoding apparatus. Accordingly, it is possible to structure a compact and low-cost picture coded signal decoding apparatus.

Further, according to the present invention, by changing the parameters in the procedure for editing the coded string, the number of series of pictures to be decoded can be changed without increasing or decreasing the number of picture decoders. Accordingly, it is possible to structure a picture signal decoding apparatus suitable for changing the number of series of picture coded signals given.

According to the present invention, a code string editing apparatus is provided which can compose a plurality of picture coded signals into one composite picture coded signal. With this apparatus, it becomes possible to generate one picture coded signal from a plurality of picture coded signals without involving decoding/coding processing.

While the present invention has been described in detail and pictorially in the accompanying drawings it is not limited to such details since many changes and modifications recognizable to: those of ordinary skill in the art may be made to the invention without departing from the spirit and the scope thereof.

We claim:

1. A method of decoding a plurality of picture signals in encoded form, supplied by a plurality of different inputs, into one decoded picture signal which is provided as a single output, said method comprising the steps of:

detecting frame delimitation of each inputted picture signal in encoded form supplied by said different inputs;

retrieving a one by one frame from each inputted picture signal in encoded form supplied by said different inputs;

editing said one by one frame of picture signals in encoded form supplied by said different inputs into a one by one frame to generate one picture signal in encoded form; and decoding said one picture signal in encoded form to generate one decoded picture signal which is provided as said signal output, wherein said editing step comprises the steps of:

dropping frames which are supplied by said different inputs more than other inputs, and generating said one picture signal in encoded form representing a composite picture including pictures corresponding to said picture signals in encoded form supplied by said different inputs.

2. A method according to claim 1, wherein said dropping step drops frames based on the timing of the inputting of a picture signal in encoded form of which a frame speed is the lowest.

* * * * *